United States Patent [19]

Harm et al.

[11] Patent Number: 4,811,095
[45] Date of Patent: Mar. 7, 1989

[54] ARRANGEMENT FOR DISPLAYING MULTIPLEXED ANALOG COMPONENTS ON A CONVENTIONAL TV MONITOR

[75] Inventors: Hartwig Harm, Haar; Harald Ibl, Steinhoering, both of Fed. Rep. of Germany

[73] Assignee: Rohde & Schwarz GmbH & Co. KG, Fed. Rep. of Germany

[21] Appl. No.: 151,325

[22] Filed: Feb. 1, 1988

[30] Foreign Application Priority Data

Feb. 13, 1987 [DE] Fed. Rep. of Germany ....... 3704456

[51] Int. Cl.⁴ .................. H04N 5/14; H04N 11/08; H04N 7/08
[52] U.S. Cl. ..................................... 358/160; 358/11; 358/12; 358/14; 358/140; 358/141; 358/33
[58] Field of Search ............... 358/11, 12, 14, 33, 358/140, 141, 142, 143, 146, 148, 165, 160

[56] References Cited

U.S. PATENT DOCUMENTS

| | | | |
|---|---|---|---|
| 4,636,835 | 1/1987 | Tan et al. | 358/12 |
| 4,639,764 | 1/1987 | Morcom | 358/14 |
| 4,651,208 | 3/1987 | Rhodes et al. | 358/141 |

OTHER PUBLICATIONS

IBA; Experimental & Development Report 120/83; "Extended-Definition MAC", Windram et al., 12/83 (FIG. 10).

*Primary Examiner*—James J. Groody
*Assistant Examiner*—Michael D. Parker

[57] ABSTRACT

For the synchronized display of MAC signals on a monitor designed to display standard video signals, a decoding device derives synchronizing pulses from the data component of the MAC signal which contains the line-frequency and field-frequency information, and a blanking stage is triggered by the synchronizing pulses for the periodic blanking of a partial segment of the MAC signal to a predetermined constant voltage level in a standard-suitable temporal relationship to the synchronizing pulses.

7 Claims, 4 Drawing Sheets

STANDARD VIDEO SIGNAL

STANDARD VIDEO SIGNAL

ARRANGEMENT FOR DISPLAYING MULTIPLEXED ANALOG COMPONENTS ON A CONVENTIONAL TV MONITOR

BACKGROUND OF THE INVENTION

1. Field of the Invention

This invention relates to an arrangement to allow a synchronized display of MAC (multiplexed analog component) signals on a television monitor which is designed to display standard video signals.

2. Description of the Prior Art

For a satellite transmission, a C-MAC system uses different modulation methods for the video signals as compared to the sound and data signals The digitally coded sound and data are broadcast as a 2-4 PSK signal and the MAC video signal is broadcast using normal frequency modulation. These two signals are time multiplexed after RF modulation. The MAC (multiplexed analog components) signal is a base-band time-multiplex signal of time compressed analog video components.

Conventional television monitors for monitoring television signals are designed to display a standard video signal such as shown in FIGS. 1a and 1b. Blanking intervals 2 between the actual pictures segments 1 occur during intervals when the picture signal is interrupted for the purpose of the return of the beam of the monitor. The signal level during the blanking interval has a predetermined constant level 3 which in most television systems corresponds to the black level of the picture signal. During the blanking interval, a line repetitive line synchronizing pulse 4 and a field repetitive field synchronizing pulse 5 are transmitted. In the monitor, a synchronizing pulse frame is created from the sequence of line and field synchronizing pulses so as to control the synchronization of the monitor. For synchronized display of the normal video signals at the correct brightness, the known monitors evaluate the synchronizing pulse frame and the black level 3 transmitted immediately after the synchronizing pulses 4.

For future satellite television transmission systems MAC signals (multiplexed analog components) such as shown in FIG. 2 will be used and there are various proposals for standards that exist. The C-MAC signal, for example, is described in the publication "Rundfunktechnische Mitteilungen" (Broadcasting reports) year 29 1985, Vol. 1, pages 23-35. The D2-MAC signal, for example, is described in "Specification du Systeme D2-MAC/Paquet" (specification of the D2-MAC/Paquet system) of September 1985 Telediffusion de France. Common to all of these different MAC signal systems, is that they have a data signal segment 6 instead of the blanking interval of the conventional television signal. The data signal segment 6 includes data pulse signals which contain in addition to sound information on line and field synchronization in coded form. This data segment 6 is followed by an analog color component segment 7 which is followed by an analog luminence component segment 8 as shown in FIG. 2. The MAC signals do not contain any analog synchronizing pulses or any black level with a timing relationship thereto and cannot, therefore, be displayed by usual conventional monitors since such monitors are not able to derive synchronizing information from the signals contained in the MAC signals. Up to this time, it is only been possible in the laboratory to display such MAC signals pictorially on the monitor using special techniques such as described in the publication Rundfunktechnische Mitteilungen year 1985, Vol. 1, Page 32, FIG. 14.

SUMMARY OF THE INVENTION

The present invention provides a simple arrangement which allows the display of MAC signals in synchronized form on standard monitors designed for the display of standard video signals.

The present invention provides an arrangement wherein MAC signals can be displayed on a standard monitor and utilizes a decoding device 15 for deriving synchronizing pulses 25 from the data components 6 of the MAC signal which contains the line and field frequency information and also uses a blanking stage 17 and 18 which are triggered by the synchronizing pulses for the periodic blanking of a partial segment 6a of the MAC signal 14 to a predetermined constant voltage level 29 which has a standard suitable timing relationship to the synchronizing pulses 25.

By using the simple auxiliary arrangement according to the invention, it is possible to display on a conventional monitor which is designed only for synchronized display of standard video signals according to FIG. 1a and 1b at the correct brightness MAC signals. The invention also allows if desired that the synchronized signals be at the correct brightness. In the simplest case, the synchronizing pulses obtained from the data component of the MAC signals are supplied to the input usually present in the conventional monitors for external synchronization and the MAC signal is blanked in a partial segment to the black value level and is supplied to the standard signal input of the monitor. It is also possible to add the derived synchronizing pulses with an additional adding circuit to the segment of the MAC signal which is blanked to the black level such that a combined television signal is supplied to the signal input of the monitor and the television signal preferably includes as does a standard video signal synchronizing pulses with adjoining black level, back porch portions in the data segment 6 and then thereafter there follows the picture segments 7 and 8 and also several blanked lines in the area of the vertical synchronizing pulses 5. These pulses can be processed by the conventional monitor like a conventional standard video signal.

In the arrangement according to the invention, it is possible without modifying the monitor to display MAC signals for monitoring purposes using only a simple auxiliary circuit where because of the serial transmission of the chromaticity-segment 7 and the luminance segment 8, there will be displayed on the monitor separately the compressed color information as the brightness modulation of a gray level and a compressed luminance picture. A time shift of the synchronizing pulses and also the blanking segment with respect to the MAC signal allows the digital sound information usually occurring in the line flyback or field flyback of the data segment 6 and/or signals of the field blanking intervals to also be displayed on the monitor.

Other objects, features and advantages of the invention will be readily apparent from the following description of certain preferred embodiments thereof taken in conjunction iwht the accompanying drawings although variations and modifications may be effected without departing from the spirit and scope of the novel concepts of the disclosure, and in which:

DESCRIPTION OF THE PREFERRED EMBODIMENTS

Figure 2:
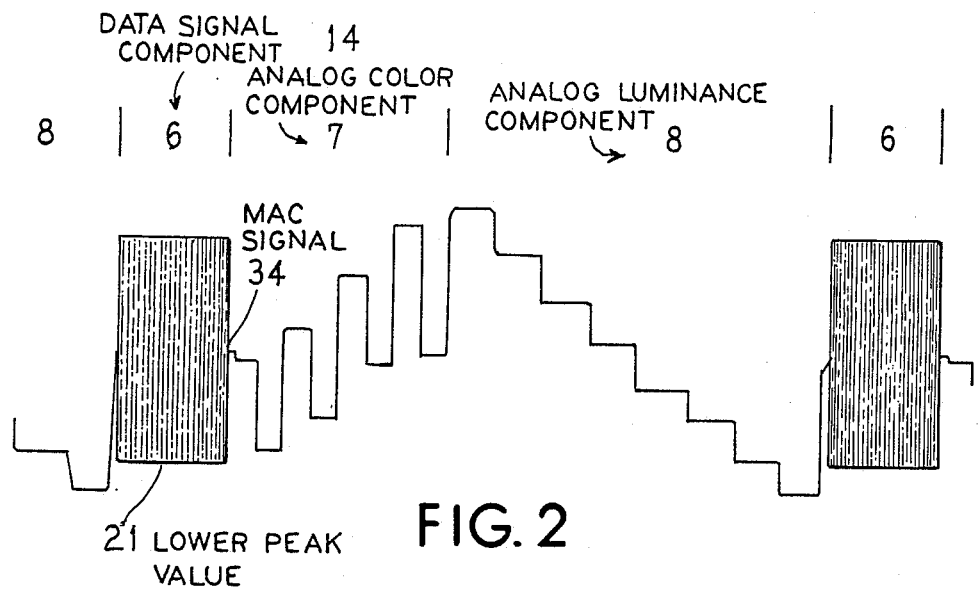
FIG. 2 illustrates the signal format of a MAC signal.
Figure 3:
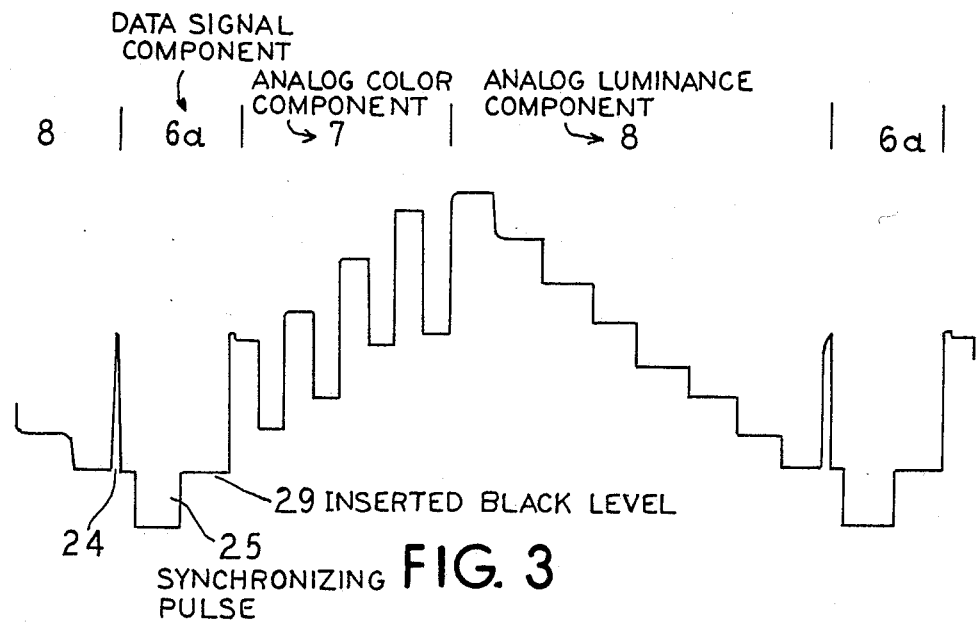
FIG. 3 illustrates a modified form of the MAC signals.
Figure 4:
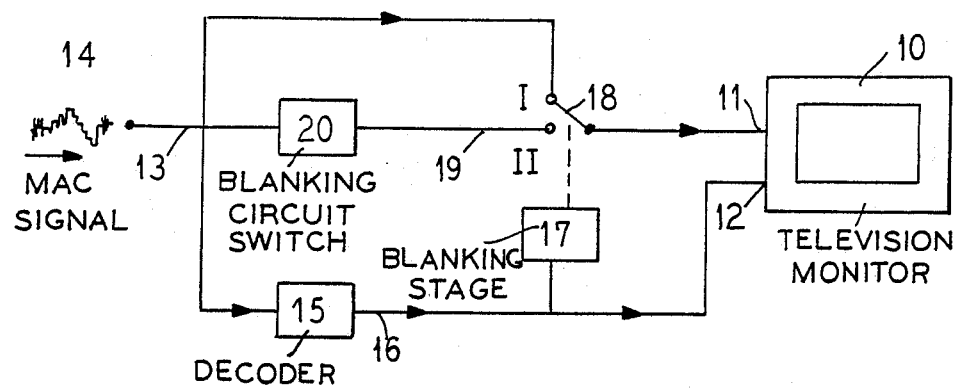
FIG. 4 is a block diagram of a first embodiment of the invention.

FIG. 4 illustrates a first embodiment of an auxiliary circuit according to the invention for a conventional television monitor 10 which has a picture signal input terminal 11 and an input terminal 12 for external synchronization. A MAC signal 14 illustrated in FIG. 2 is supplied to the input terminal 13. A decoding device 15 of a conventional type is connected to receive the input from terminal 13 and produces a combined synchronizing pulse framework at its output 16 from the data component 6 of the MAC signal 14 which contains in coded form, the line repetitive and field repetitive synchronizing information according to MAC signal standardization. The combined synchronizing frame is supplied directly to the input terminal 12 of the monitor 10 to provide external synchronization and is also supplied to a blanking stage 17 which in a time relationship to the synchronizing pulses which are suitable for the standard blanks by way of the switch 18 a partial segment of the MAC signal which is supplied to the input terminal 13 from being supplied to the picture input terminal 11. For display of the MAC signal picture segments only which are the segments 7 and 8 illustrated in FIGS. 2 and 3, the blanked segment shown in FIG. 3 corresponds to the data component of the original MAC signal. In this blanking interval of the data component 6, there is introduced a predetermined constant voltage level 19 and this is supplied to the II position of switch 18 so as to apply such constant voltage level 19 to terminal 11 in a time relationship to the synchronizing pulses which are supplied to the input 12. The voltage level 19 preferably corresponds to the black level of the MAC signal. The black level 19 can be obtained in a suitable manner by using a switch 20 directly from the MAC signal 14. According to the MAC signal standard, the lower peak value 21 shown in FIG. 2 of the data components 6 corresponds accurately enough to the black value for many applications. The MAC signals also contain the black level in the lines not visible on flyback (for example, in line 624) in segment 8 and with a suitable blanking circuit 20, the black level 19 may also be derived from this picture signal segment of the MAC signal 14. It is also possible to artificially generate the black level.

Figure 5:
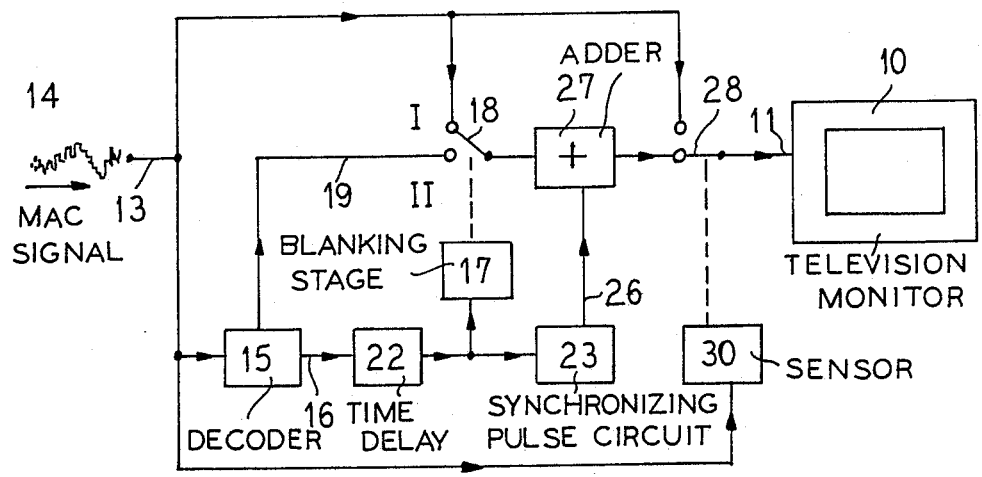
FIG. 5 is a block diagram of a second embodiment of the invention.

FIG. 5 illustrates another embodiment of the auxiliary circuit for allowing a MAC signal to be displayed on the conventional monitor 10 by using the picture signal input terminal 11 only without an input 12 for external synchronization. For this purpose, a pulse sequence is generated at the output 16 of the decoder 15 from the MAC signal 14 which is supplied to the input 13 by evaluation of the synchronizing line frequency and field frequency information contained in the data component 6 in digitally coded form. Such pulse sequence is supplied through a delay circuit 22 to a blanking stage 17 which controls the switch 18. The output of the delay circuit 22 is also supplied to a synchronizing pulse circuit 23. The synchronizing pulse circuit 23 is constructed such that in a standard suitable time relationship to the blanking interval 6a shown in FIG. 3 determined by the blanking circuit 17 a synchronizing pulse 25 occurs at the output 26 of circuit 23 which is delayed by a predetermined period with respect to the beginning 24 shown in FIG. 3 of the blanking interval 6a.

Figure 1A:
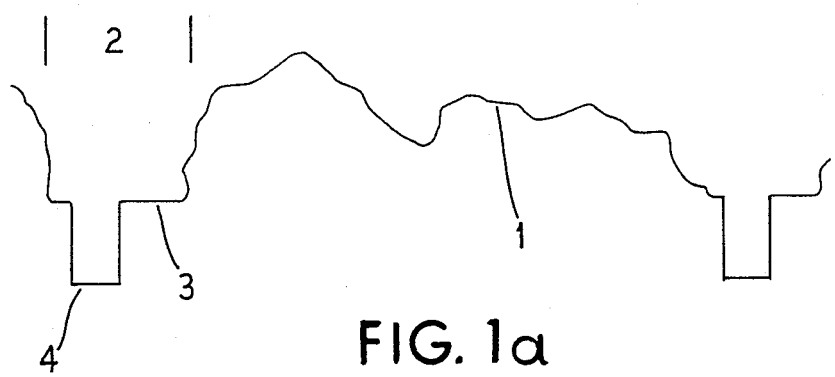
FIGS. 1a and 1b illustrate the format of conventional television signals.
Figure 1B:
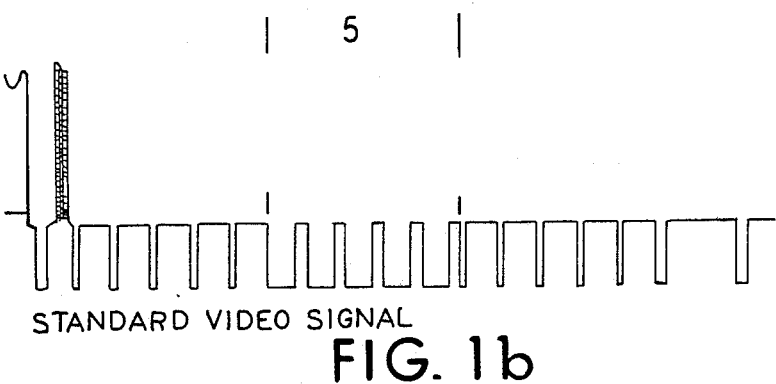

The standard suitable time relationship in this case is the time relationship which is normally used for standard video signals shown in FIG. 1 between the synchronizing pulse 4 and the black level 3. The synchronizing pulse 25 is supplied from circuit 23 to the adding stage 27 which also receives the blanked MAC signal from the switch 18 which is controlled by the blanking stage 17. In this manner, in the blanking position II of the switch 18 in which the black level 19 is inserted into the blanking interval 6a, the synchronizing pulse 25 is simultaneously inserted into the blanking interval 6a and this is shown in FIG. 3. In the other position I of the switch 18, the remaining component of the MAC signal 14 is also supplied subsequent to the blanking interval 6a to the adding stage 27 and through the switch 28 to the input 11 of the monitor so that a synchronized display of the successive lines of the MAC signals will occur on the monitor due to the inserted synchronizing pulses 25 which are similar to the standard video signal illustrated in FIG. 1.

At the same time, a display at the correct brightness is assured due to the inserted black level 29. The monitor thus evaluates the signals 25 and 29 illustrated in FIG. 3 which are inserted into the blanking level 6a in the same manner as the signal components 4 and 3 from a standard video signal such as shown in FIG. 1a. The black level 19 is derived in the circuit according to FIG. 5 directly by the decoding device 15 from the MAC signal 14 either from the lower peak value 21 or from the picture signal segment transmitted during the field flyback. It is also possible to generate the black levels artificially from the information of the MAC signal corresponding to the level 34 shown in FIG. 2 by addition of a constant level signal. A decoding device 15 with the characteristics described for the generation of the synchronizing pulse train at its output 16 or for deriving the black level 19 is known per se and is used with special receivers which have been developed to receive MAC signals.

According to FIG. 5, another switch 28 is provided which is controlled by a sensor circuit 30 that also receives the MAC signal 14 and the sensor circuit 30 is of known construction and makes it possible to recognize from the signal supplied to the input whether a MAC signal or another signal is being used such as, for example, a standard television signal. If the sensor circuit 30 recognizes a MAC signal, the switch 28 is moved into the position shown in FIG. 5 and the signal illustrated in FIG. 3 is supplied to the input 11 of the monitor. Otherwise, the switch 28 will be in the other switch position and the signal supplied to the input terminal 13 will be supplied to the monitor input 11 which may be standard video signal and it will be displayed on the monitor 10.

Figure 6:
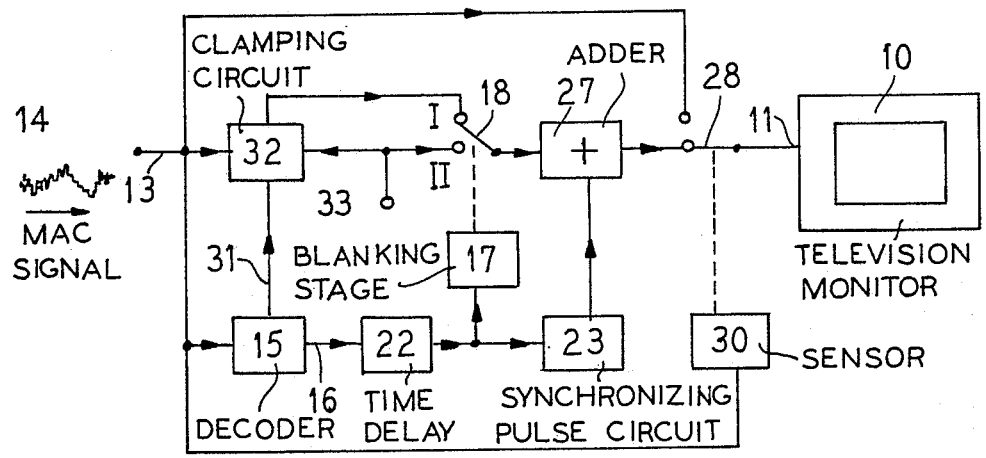
FIG. 6 is a block diagram of another modification of the invention.

FIG. 6 illustrates another modification of the invention for blanking the data segment 6 to a predetermined constant black level. In this embodiment, the decoding device 15 is constructed so that it delivers a control pulse at an output 31 which has a timing that corresponds to the appearance of the black level in the MAC signal. This control pulse is supplied to a clamping circuit 32 which receives at its input the MAC signal 14. Also, a constant voltage level 33 is supplied to the clamping circuit 32 and the constant voltage level may preferably be zero volts. With this circuit, it is possible to displace the MAC signal in a manner such that the black level 29 of the blanked MAC signal appears exactly at the standard suitable level of zero volts. At the time of black level transmission in the MAC signal which is indicated by the control pulse 31, the black level is measured in the clamping circuit and by level shifting the whole MAC signal supplied to the input of the clamping circuit 32 will then be displaced such that the black level in the MAC signal corresponds to the predetermined zero voltage level 33. In this manner, a MAC signal having the precise zero volt black level is supplied to the input 11 of the monitor when the switch 18 is in position I. It is noted that this signal is supplied through the adder 27.

The line synchronizing pulse 25 is derived in the decoding device 15 preferably directly from the beginning 24 of the data component 6 of the MAC signal 14. The frame synchronizing pulse is on the other hand preferably read out from the digitally coded information content of the data component. With the frame synchronizing pulse derived in this manner from the data component of the first line of the MAC signal, it is automatically determined.

By using the additional delay circuit 22, it is possible to delay for predetermined periods, the lines in field synchronizing pulses derived by the decoding device 15 from the data component so that the blanking segment 6a can be transferred to any desired position within the MAC signal shown in FIG. 3. Thus, if for example, the data component 6 of the MAC signal shown in FIG. 2 is to be displayed on the monitor, the blanking interval is displaced into a new unnecessary portion of the picture components 7 or 8. So as to shift the line synchronizing pulses a maximum time shift of 64 microseconds (which is the line spacing) is sufficient for displacement of the picture synchronizing pulse the delay must be adjustable in multiples of 64 microseconds up to 20 milliseconds so that a shift in the entire field area is possible.

It is to be realized that the other components illustrated in FIG. 6 are common to those shown in FIG. 5 and will not be redescribed.

Although the invention has been described with respect to preferred embodiments, it is not to be so limited as changes and modifications can be made which are within the full intended scope of the invention as defined by the appended claims.

We claim as our invention:

1. An arrangement for the synchronized display of MAC signals on a monitor which is designed to display standard video signals, comprising a decoding device (15) for deriving synchronizing pulses (25) from the data component (6) of the MAC signal containing the line- and field frequency information, a blanking stage (17, 18) receiving the output of said decoding device and triggered by the synchronizing pulses and periodically blanking a partial segment (6a) of the MAC signal (14) to a predetermined constant voltage level (29) in standard-suitable timing relationship to the synchronizing pulses (25).

2. An arrangement according to claim 1, wherein the partial segment (6a) is blanked to the black level (19) of the MAC signal (14).

3. An arrangement according to claim 2, wherein the black level is derived from the MAC signal (14) by means of the decoding device (15).

4. An arrangement according to claim 1 or claim 2, wherein the black level-determined timing of the MAC signal (14) is determined by means of the decoding device (15) and the black level of the MAC signal is clamped to a predetermined constant level (0 volts) by means of an additional clamping circuit (32).

5. An arrangement according to claims 1 or 2 or 3 wherein the derived synchronizing pulses are added to the MAC signal (14) in an adding stage (27) during the blanked partial segment (6a).

6. An arrangement according to claims 1 or 2 or 3 wherein a delay circuit (22) time displaces the derived synchronizing pulses.

7. An arrangement according to claims 1 or 2 or 3 including a switch (28) for connecting the signal input (13) directly to the picture signal input (11) of the monitor (10), said switch (28) controlled by a MAC signal recognition sensor circuit (30), so that the MAC signal which is blanked to a constant level is supplied to the monitor only when a MAC signal is actually present at the input (13).

* * * * *